D. M. BERNARD.
COMBINATION DRAWING AND MEASURING INSTRUMENT.
APPLICATION FILED NOV. 2, 1917.

1,307,233. Patented June 17, 1919.

INVENTOR,
David Meade Bernard

UNITED STATES PATENT OFFICE.

DAVID MEADE BERNARD, OF JACKSONVILLE, FLORIDA.

COMBINATION DRAWING AND MEASURING INSTRUMENT.

1,307,233.  Specification of Letters Patent.  Patented June 17, 1919.

Application filed November 2, 1917. Serial No. 199,856.

*To all whom it may concern:*

Be it known that I, DAVID MEADE BERNARD, of the city of Jacksonville, in the county of Duval and State of Florida, have invented a new and useful Combination Drawing and Measuring Instrument; and I do hereby declare that the following is a full, clear, and exact description of the same, reference being had to the accompanying drawings, which form a part of this specification, like parts of the drawings being similarly numbered.

The invention relates to that class of instruments known as combination drawing and measuring instruments and more especially to compasses, straight edges, protractors and instruments for determining regular polygons and belongs to the perforated instrument class.

The object sought is to provide a simple, convenient and comprehensive instrument which will be generally useful in the drafting art and especially useful to the student of mathematics. Made on a smaller scale than that shown in the accompanying drawings, an instrument can be obtained which is sufficiently small to carry in the vest pocket and at the same time sufficiently comprehensive to furnish most of, if not all of, the needs of the average student of mathematics. It is also an object of this invention to so designate perforations that they may be located and their distances from a point determined without arithmetical calculations. The instrument is preferably, though not necessarily, made of a transparent celluloid like material. A plurality of materials may be used in making the instrument if desired.

Figure 1:
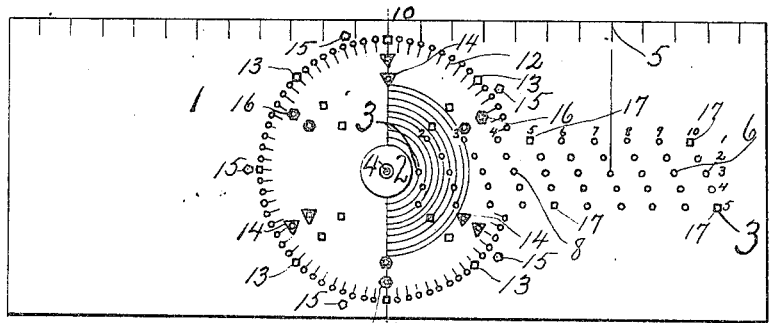
Figure 1 is a top plan view of my instrument showing my system of perforations, 3. This system 3 is also shown combined with other systems of perforations and scales.

Fig. 1 shows a rectangular plate, 1, having a disk, 2, perforated at its center 4, and pivotally secured in said plate. Plate 1 has a system of perforations, 3, arranged in parallel rows, one row of which 6, is in alinement with center 4, has its successive perforations spaced equidistant apart and is parallel to the upper edge of the plate 1. Let this distance between successive perforations of said basal row 6, be called a unit's distance. The first perforation of this row is here shown to be a unit's distance from center 4, though any other convenient distance may be selected. Fig. 1 shows five parallel rows of perforations, hence the perforations of each of these rows have been placed one-fifth of a unit's distance farther from center 4 than the corresponding perforations of the row immediately above and adjacent to it. Thus the perforations of the parallel rows when taken in a transverse direction form spirally disposed rows with reference to center 4 as a center. This arrangement of perforations in parallel rows in one direction and spiral rows with reference to a center 4 in another direction greatly facilitates locating any perforation of the system and determining its distance from the center 4, for since every perforation lies at the intersection of one of the spiral and one of the parallel rows it is only necessary to number the rows and not every different perforation. Thus perforation 8, is accurately designated as 4, 3, measuring it is on the fourth spiral row from the center 4, and third parallel row from the top. This system of numbering is subject to many variations and I do not intend to limit myself to the numbers shown in this or any of the figures which follow.

To draw a circle, place center 4 over the desired center, press the finger on disk 2, insert pencil point through desired perforation of system 3 and rotate the instrument about disk 2. It is evident from the drawing and above description that the perforations of system 3 each taken with center 4 constitutes a system of successive radii whose common difference is one-fifth of a unit. If N parallel rows are used the common difference between successive radii will be 1/N of a unit. Since one of the parallel rows, 6, is in alinement with center 4 a rectilinear scale of equal distances is secured. The respective perforations of this row, 6, are shown in vertical alinement with the divisions of the scale of equal distance, 5, at the upper edge of the instrument and may be used in conjunction with the divisions of scale 5 and the edges of the instrument to determine perpendiculars and parallels as any one skilled in the art will readily see. In these particulars, system 3 with center 4 differs from other systems of perforations involving rows of perforations spirally disposed with reference to a center. System 3 differs from all systems involving a fixed center point and parallel rows of perforations, the perforations of which do not form spirally disposed rows of perforations with reference to said center point, in that it constitutes with center 4, a system of successive radii which have a common difference.

While the arrangement of the parallel rows of perforations with reference to the basal row 6 and to each other to form transverse spiral rows of perforations as shown in Fig. 1 is the preferable arrangement, the relative order of these parallel rows may be varied and a compass still secured which will give a system of successive radii having any desired common difference and furnishing also a scale of equal distances capable of being used in conjunction with a scale of equal distances placed at the edge of the instrument to determine perpendiculars and parallels. The protractor scale 12, Fig. 1 has its center at 4. This scale may be perforated at its division points or not as desired.

The small squares 13, triangles 14, and pentagons 15 designate respectively the vertices or perforations placed at the vertices of squares, equilateral triangles and regular pentagons having the common center 4. The small triangles 14 and hexagons 16 taken together designate perforations placed at the vertices of regular hexagons whose center is at 4.

To draw a regular polygon, say a pentagon, of any given radius, press the finger on disk 2, insert pencil in a pentagonally designated perforation making a dot, P, on the drawing surface. Now insert pencil through desired perforation of system 3, remove pencil and revolve the instrument about disk 2 until the next pentagonally designated perforation covers P and insert pencil through the first selected hole of system 3. This is the second vertex of the pentagon. Locate the others similarly. Having located the last vertex of the pentagon a regular decagon having the same center and radius may now be determined by rotating the instrument from its last position about disk 2 through 36 degrees by means of the protractor scale 12 and then locating the vertices of a second pentagon as before. The vertices of the two pentagons determine the required decagon. The other polygonally designated perforations are similarly used. If the instrument is not perforated at the vertices of the regular polygons an auxiliary line is used instead of the auxiliary dot, P, to determine the vertices of regular polygons. Thus, if a pentagon is desired place the center of the disk and a pentagonally designated vertex on the line. Now revolve the instrument about the disk and as it turns every time a pentagonally designated vertex covers the line on the same side of the center make a dot through the desired perforation of system 3 until five points have been so located. These five points are the vertices of a regular pentagon. To get a regular decagon, make a dot through the desired perforation of system 3 every time a pentagonally designated vertex covers the auxiliary line on either side of the center.

Polygons 17, may be placed, say, on every fifth row of system 3 to facilitate counting. Fig. 1 shows three distance methods of designating perforations by polygons. The triangles, 14, are shown in outline, the squares, 13, represent square perforations, and the hexagons, 16, show a distinctive surface. All may be spoken of as polygonally designated perforations. These methods of designating perforations are shown in applicant's application bearing Serial Number 108,428, filed July 10, 1916, and bearing title, "Drawing and measuring instruments."

Figure 2:
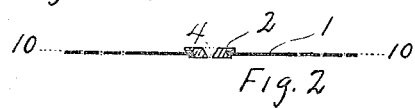
Fig. 2 shows section 10—10 of Fig. 1.

Fig. 2 shows section 10—10 of Fig. 1. The disk 2 Fig. 2 may assume the form of an eyelet and be made of a solid piece of material or may be made by fastening in any convenient manner two or more distinct disks.

Figure 3:
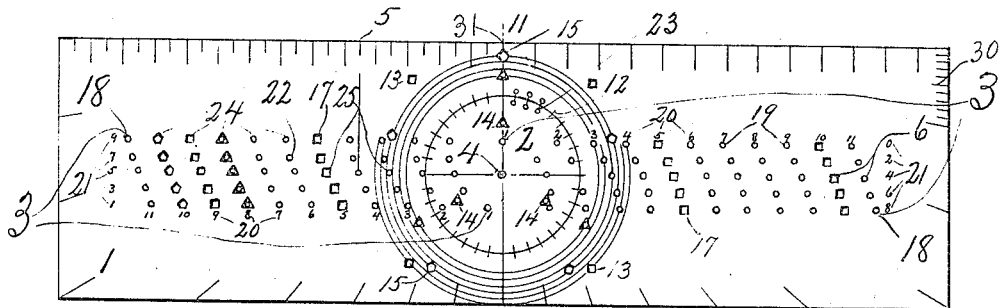
Fig. 3 shows my system of perforations 3, used a plurality of times and the perforations of each system bearing a staggered relation with reference to those of the other and forming the system 18.

In Fig. 3, system 3 is used twice and since the perforations of the system shown to the right of the vertical axis 11—11 are staggered with relation to those at the left with reference to center 4, the two said systems 3 form one system, 18, which gives double the number of radii furnished by either of the systems 3 with center 4 and furnishes a common difference between successive radii which is half that furnished by either of systems 3. The two systems 3 here show their parallel rows to be in alinement. The parallel rows of the two systems may be placed at angles to each other. The system 3 may be repeated as often as desired, the perforations of each being staggered with reference to those of every other.

The top row of perforations 19, has its perforations spaced each at an integral number of units' distance from center 4. The small numerals 20, numbering the spiral rows, and those 21, numbering the parallel rows, not only locate any perforation but tell its distance from center 4, thus, perforation 22, lying on spiral row number 6 and rectilinear row number 7 is designated as perforation 6, 7 and is hence 6.7 units from center 4, the number on the spiral row giving the number of units and that on the rectilinear row the number of tenths, there being ten rectilinear rows. In Fig. 3, disk 2 is shown sufficiently large to receive a protractor scale, 23, and to contain some of the perforations of systems 3. It also shows perforations at the vertices of regular polygons as shown by the small triangles 14.

The rows may be conveniently grouped, preferably in sets of five, 24, a third row of a group being designated by triangles, a fourth row by squares and a fifth row by pentagons. The same principle of grouping and designating the rows of a group is also applicable to the rectilinear rows of perforations. The perforations of the parallel row 25, are shown in vertical alinement with divisions of the scale of equal distances, 5. The protractor 30, has its center on the upper edge of the instrument at 31.

Figure 4:
Fig. 4 shows a section 11—11 of Fig. 3.

Fig. 4 shows section 11—11 of Fig. 3.

I claim:

1. A drafting instrument containing a definitely determined point and a rectilinear row of perforations in alinement therewith, the successive perforations of said row being spaced an arbitrarily chosen unit's distance apart, and said instrument containing other rows of perforations parallel to said row, the successive perforations of each of which differ in distance from said point by said unit's distance, the last said rows and the first said row forming a system of parallel rows of perforations the corresponding perforations of the adjacent rows of which differ in distance from the said point by 1/N of said unit's distance, N representing the number of rows of said system, and furthermore each row, which lies between two other rows, having its perforations removed each 1/N of said unit's distance farther from said point than the corresponding perforations of one adjacent row and 1/N of unit's distance nearer said point than corresponding perforations of the other adjacent row, and said instrument having perforations placed at the vertices of concentric regular polygons whose common center is coincident with said point.

2. A drafting instrument containing a definitely determined point and a rectilinear row of perforations in alinement therewith, the successive perforations of said row being spaced an arbitrarily chosen unit's distance apart, and said instrument containing other rows of perforations parallel to said row, the successive perforations of each of which differ in distance from said point by said unit's distance, the last said rows and the first said row forming a system of parallel rows of perforations the corresponding perforations of the adjacent rows of which differ in distance from the said point by 1/N of said unit's distance, N representing the number of rows of said system, and furthermore each row, which lies between two other rows, having its perforations removed each 1/N of said unit's distance farther from said point than the corresponding perforations of one adjacent row and 1/N of a unit's distance nearer said point than the corresponding perforations of the other adjacent row, and said instrument containing a protractor scale, and containing also perforations at the vertices of concentric regular polygons, the center of said protractor scale and the center of said polygons coinciding with said definitely determined point.

3. A drafting instrument containing a definitely determined point and a system of N, N being a positive integer greater than 1, parallel rows of perforations, one row being in alinement with said point and having its successive perforations spaced an arbitrarily chosen unit's distance apart, the successive perforations of each of the N rows differing in distance from said point as they recede therefrom by said unit's distance, and the perforations of each of the N rows differing in distance from said point as they recede therefrom respectively from the perforations of another of said N rows by 1/N of said unit's distance, and the successive perforation of each of the N rows differing in distance from said point as they recede therefrom respectively from the perforations of every other row of the N rows, and said instrument containing a second system of perforations conforming to the description of the first, the perforations of the second system being staggered with relation to those of the first with reference to their distances from said point, the two said systems forming one system of 2N rectilinear rows of perforations.

4. A drafting instrument having a body portion and a disk, said disk being perforated at its center and pivotally secured in said body portion, and said instrument containing a rectilinear row of perforations in alinement with said center, the successive perforations of said row being spaced an arbitrarily chosen unit's distance apart, and said instrument containing other rows of perforations parallel to said row, the successive perforations of each of which differ in distance from said center by said unit's distance the last said rows and the first said row forming a system of parallel rows of perforations the corresponding perforations of the adjacent rows of which differ in distance from said center by 1/N of said unit's distance, N representing the number of rows of said system, and furthermore each row which lies between two other rows, having its perforations removed each 1/N of said unit's distance farther from said center than the corresponding perforations of one adjacent row and 1/N of a unit's distance nearer said center than the corresponding perforations of the other adjacent row, and said instrument containing a second system of perforations conforming to the description of the first, the perforations of the second system being staggered with relation to those of the first with reference to their distances from said center, the two said systems forming one system of 2N rectilinear rows of perforations, and said instrument containing a protractor scale whose center is coincident with the center of said disk.

5. A drafting instrument having a body portion and a disk, said disk being perforated at its center and pivotally secured in said body portion, and said instrument containing a rectilinear row of perforations in alinement with said center, the successive perforations of said row being spaced an arbitrarily chosen unit's distance apart, and said instrument containing other rows of perforations parallel to said row, the successive perforations of each of which differ in distance from said center by said unit's distance the last said rows and the first said row forming a system of parallel rows of perforations the corresponding perforations of the adjacent rows of which differ in distance from said center by 1/N of said unit's distance, N representing the number of rows of said system, and furthermore, each row which lies between two other rows having the perforations removed each 1/N of said unit's distance farther from said center than the corresponding perforations of one adjacent row and 1/N of a unit's distance nearer said center than the corresponding perforations of the other adjacent row, and said instrument containing a second system of perforations conforming to the description of the first, the perforations of the second system being staggered with relation to those of the first with reference to their distances from said center, the two said systems forming one system of 2N rectilinear rows of perforations, and said instrument having perforations placed at the vertices of concentric regular polygons whose common center is coincident with the center of said disk.

6. A drafting instrument having a body portion and a disk, said disk being perforated at its center and pivotally secured in said body portion, and said instrument containing a rectilinear row of perforations in alinement with said center, the successive perforations of said row being spaced an arbitrarily chosen unit's distance apart, and said instrument containing other rows of perforations parallel to said row, the successive perforations of each of which differ in distance from said center by said unit's distance the last said rows and the first said row forming a system of parallel rows of perforations the corresponding perforations of the adjacent rows of which differ in distance from said center by 1/N of said unit's distance, N representing the number of rows of said system, and furthermore, each row which lies between two other rows having its perforations removed each 1/N of said unit's distance farther from said center than the corresponding perforations of one adjacent row and 1/N of a unit's distance nearer said center than the corresponding perforations of the other adjacent row, and said instrument containing a second system of perforations conforming to the description of the first, the perforations of the second system being staggered with relation to those of the first with reference to their distances from said center, the two said systems forming one system of 2N rectilinear rows of perforating, and said instrument containing a protractor scale, and containing also perforations at the vertices of concentric regular polygons, the center of said protractor scale and the center of said polygons coinciding with the center of said disk.

7. A drafting instrument containing perforations arranged in rows, the rows of perforations being arranged in groups, certain rows of each group being distinguished by means of small polygons substantially as described, the number of sides of the polygon used to distinguish any row of a group being the same as the number of the row of that group.

8. A drafting instrument containing a definitely determined point and a system of rectilinear rows of perforations the perforations of which when taken in a transverse direction form spirally disposed rows of perforations with reference to said point as a center, every Nth spirally disposed row of the system being distinguished by small polygons substantially as described, N being any integer not greater than the number of spirally disposed rows of said system.

9. A drafting instrument containing a definitely determined point and a system of rectilinear rows of perforations, the perforations of which when taken in a transverse direction form spirally disposed rows of perforations with reference to said point as a center, the spirally disposed rows and the rectilinear rows being so numbered that the number on any spirally disposed row and the number on any intersecting rectilinear row when taken together substantially as described give the distance of the perforation common to both rows from the said definitely determined point.

10. A drafting instrument containing a definitely determined point and a system of rectilinear rows of perforations, the perforations of which when taken in a transverse direction form spirally disposed rows of perforations with reference to said point as a center, the said spiral rows of perforations being numbered and said rectilinear rows of perforations being numbered.

11. A drafting instrument containing a definitely determined point and a rectilinear row of perforations in alinement therewith, the successive perforations of said row being spaced an arbitrarily chosen unit's distance apart, and said instrument containing other rows of perforations parallel to said row, the successive perforations of each of which differ in distance from said point by said unit's distance, the last said rows and the first said row forming a system of parallel rows of perforations the corresponding perforations of the adjacent rows of which differ in distance from the said point by 1/N of said unit's distance, N representing the number of rows of said system, and furthermore each row, which lies between two other rows, having its perforations removed each 1/N of said unit's distance farther from said point than the corresponding perforations of one adjacent row and 1/N of a unit's distance nearer said point than the corresponding perforations of the other adjacent row, and said instrument having designated thereon the vertices of concentric regular polygons whose common center is coincident with said point.

12. A drafting instrument containing a definitely determined point and a rectilinear row of perforations the successive perforations of which differ in distance from said point by an arbitrarily chosen unit distance, and said instrument containing other rows of perforations parallel to said row, the successive perforations of each of which differ in distance from said point by said unit's distance, the last said rows and the first said row forming a system of parallel rows of perforations the corresponding perforations of the adjacent rows of which differ in distance from the said point by 1/N of said unit's distance, N representing the number of rows of said system, and said instrument having designated thereon the vertices of concentric regular polygons whose common center is coincident with said point.

DAVID MEADE BERNARD.